United States Patent Office 3,684,440
Patented Aug. 15, 1972

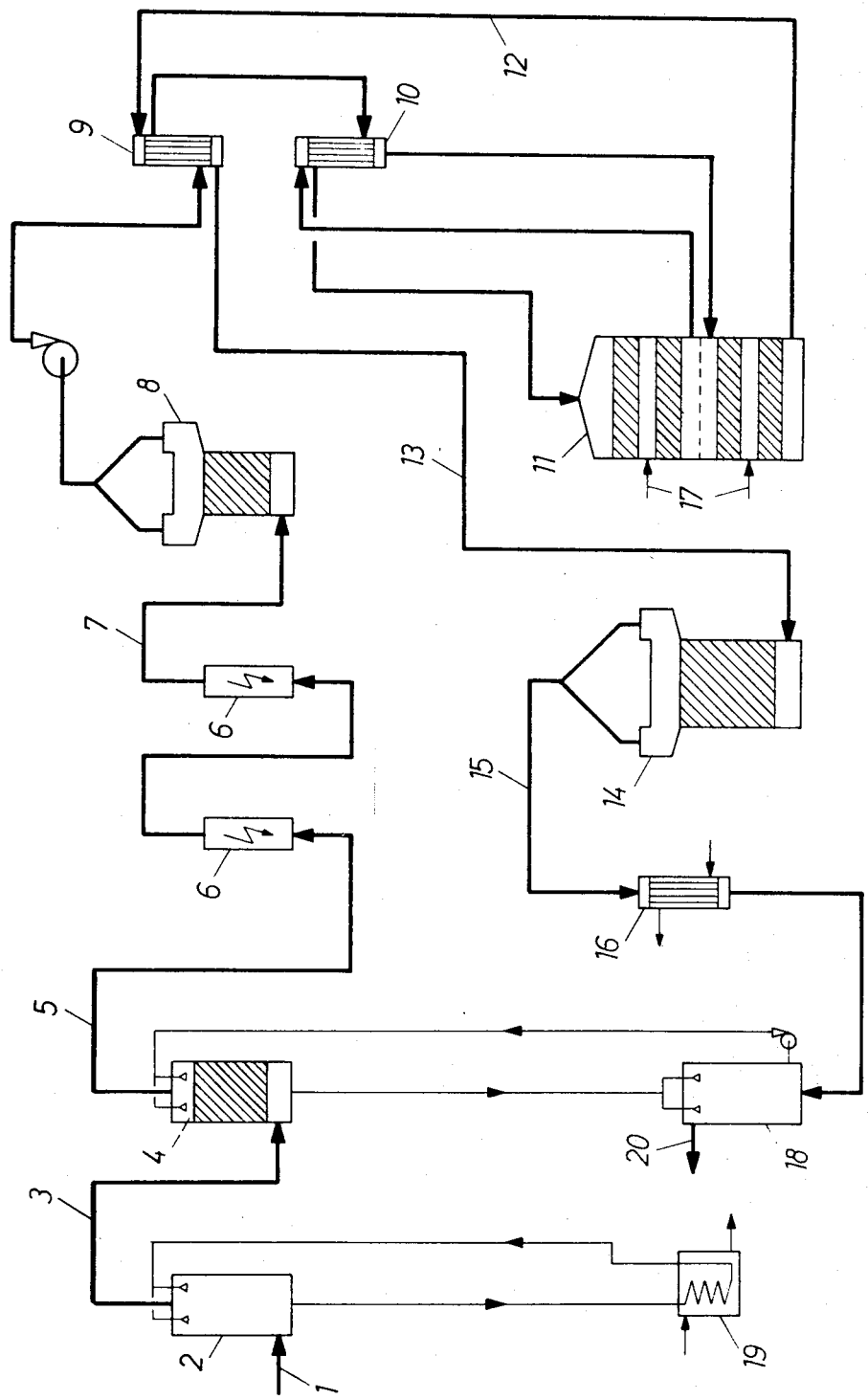

3,684,440
COOLING CYCLE FOR SULFURIC ACID CONTACT PLANT
Adolf Stauffer, Pulheim, Germany, assignor to Chemiebau
Dr. A. Zieren GmbH & Co. KG, Cologne, Germany
Filed Apr. 22, 1970, Ser. No. 30,793
Claims priority, application Germany, Apr. 30, 1969,
P 19 22 012.3
Int. Cl. C01b 17/76, 17/80
U.S. Cl. 423—522         11 Claims

ABSTRACT OF THE DISCLOSURE

In a contact process for the production of sulfuric acid, said process comprising the steps of:
(a) cooling hot $SO_2$-containing feed gas by direct or indirect heat exchange with a cooling liquid;
(b) converting said $SO_2$-containing gas to an $SO_3$-containing gas in a contact reactor;
(c) absorbing $SO_3$ from said $SO_3$-containing gas with concentrated sulfuric acid in an adsorption tower; and
(d) withdrawing a waste gas from said absorption column, said waste gas being substantially free of water vapor, sulfur trioxide and containing a minor amount of sulfur dioxide, and having a temperature of about 30–70° C. as it is withdrawn from the absorption tower, the improvement comprising:
employing said waste gas as a cooling medium for said cooling liquid, said cooling liquid being cooled by evaporative cooling into said waste gas. This process is especially applicable to plant sites having humid weather or insufficient cold cooling water.

BACKGROUND OF THE INVENTION

This invention relates to the production of sulfuric acid by the contact process, and in particular to an improvement in the technique of cooling the media employed for cooling or scrubbing the $SO_2$-containing gaseous feed.

In the purification of sulfur dioxide-containing gases fed to a contact plant to oxidize $SO_2$ to $SO_3$, impure gases are generally cooled, as part of the purification process, to reduce the water vapor content thereof. If not so cooled, a high water vapor content of these cases would impair the operation of the electrostatic filters. In addition, there would be obtained an undesired dilution of the sulfuric acid employed in the drying tower used for eliminating residual water vapor before the gases enter the contact reactor.

More specifically, it is conventional to scrub $SO_2$-containing gases obtained, for example, by roasting sulfide ores, by spraying with dilute sulfuric acid, and then to cool the resultant scrubbing acid and recycle same. In practice, cooling is effected, almost without exception, by heat exchange with water. In order to cool the scrubbing acid sufficiently, the cooling water temperature should be as low as possible in order to keep the size and cost of the heat exchanger from becoming prohibitive. Thus, in countries having a hot climate, a serious problem arises when it is not possible to obtain water at a sufficiently low temperature, for example below 25° C. Particularly in plants employing cycling and recooling of the cooling water, it is not simple to maintain an economically acceptable temperature level of the water.

In German Pat. 643,878 and German patent application Z 1841 IVb/12i, it is suggested that the scrubbing acid can be cooled by evaporative cooling, either by expensive vacuum evaporation or by absorption into air. However, neither method has become popular in practice. In the atmospheric air process, the scrubbing acid can be cooled to the air wet-bulb temperature as a lower limit. This means that a climate having dry air permits considerable cooling, whereas in areas of high humidity, the cooling effect is minor, and therefore insufficient for cooling the scrubbing acid.

SUMMARY OF THE INVENTION

Bearing in mind the above-described problems, an object of this invention is to provide an improved cooling cycle, particularly for cooling scrubbing acid in sulfuric acid contact plants, the improvement being especially applicable to plant sites where there is an insufficiency of cold cooling water or where the climate is relatively humid.

Upon further study of the specification and appended claims, other objects and advantages of the present invention will become apparent.

To attain these objectives, the waste gas from the final sulfuric acid absorption tower is employed to cool one or more liquid cooling cycles. The liquid cycle can be the scrubbing acid cycle directly, or it can be a water cycle which, in turn, serves to cool the scrubbing acid. The expression "waste gas" of the sulfuric acid contact plant is to denote the reaction gas after the catalytic oxidation of the sulfur dioxide to sulfur trioxide and the subsequent absorption of the sulfur trioxide in concentrated sulfuric acid or oleum. This waste gas withdrawn from the absorber generally having a temperature of approximately 30–70° C. still contains about 0.15 volume percent of $SO_2$, but no water vapor, due to the drying effect of the sulfuric acid, and is substantially free of $SO_3$. Despite its elevated temperature, this waste gas, normally blown off into the atmosphere, is suitable for cooling liquid cycles. In other words, because considerable amounts of water vapor can evaporate from an aqueous liquid into the dry waste gas, a substantial cooling effect is obtained by evaporative cooling of the liquid. Consequently, by the present invention, it is possible to cool liquid cycles effectively even under unfavorable local conditions, such as high cooling water temperature and high humidity.

DETAILED DISCUSSION OF THE INVENTION

In accordance with one embodiment of the invention, the recycle scrubbing acid used for purifying the $SO_2$-containing gases is cooled directly with the waste gas. As opposed to direct cooling with air which exhibits the disadvantage that the sulfur dioxide absorbed in the scrubbing acid is partially desorbed and lost, direct cooling with the waste gas still containing small amounts of $SO_2$, ranging around 0.15 volume percent results in a much lower loss of $SO_2$. This additional advantage is especially evident when the scrubbing acid discharged from the scrubber hasa high temperature, e.g., about 60 to 70° C.; for in such a case, there is only a very minor transfer of $SO_2$ from the acid into the waste gas.

In accordance with another embodiment of the invention, the scrubbing acid is cooled by means of an intermediate water cycle, the latter being cooled by the waste gas. In this mode of operation, the heat from the scrubbing acid is transferred to this cooling water cycle in an indirect heat exchanger. The cooling water cycle is preferably cooled by the waste gas directly. In this manner, all $SO_2$ losses by transfer from the scrubbing acid to the cooling medium are avoided. On the other hand, the wet-bulb temperature of the waste gas from the absorber, i.e. the minimum temperature attainable for the cooled liquid when cooling with the waste gas, is so low that a sufficient temperature gradient is present at the two transition points of waste gas/water and water/scrubbing acid.

In accordance with a further embodiment of this invention, in case of several series-connected scrubbing stages for the purification of the $SO_2$ feed gas, the scrubbing acid from at least one stage is cooled directly with the waste gas. The $SO_2$-containing feed gas to be purified flows, in most cases, through two series-connected scrubbing stages charged with dilute sulfuric acid. The scrubbing acid cycles of both stages must be cooled, and the temperature in the second stage must be so low that the water vapor content of the gas from the second stage does not exceed the amount required for the acid production. The waste gas of the contact plant can be utilized to cool one of the two scrubbing acid cycles or, if the quantity of waste gas is sufficient, both cycles.

In accordance with another embodiment of the invention, the waste gas of the sulfuric acid contact plant is first cooled and then employed for cooling the liquid cycle, especially the scrubbing acid cycles. The temperature of the waste gas is generally about 30–70° C., depending on the manner in which the $SO_3$ absorption step is conducted. Although it is possible to cool the liquid cycles with this gas directly, it is also possible to precool the waste gas by indirect heat exchange, preferably against air to 25–35° C. By means of the waste gas, indirectly precooled in this fashion, it is possible without any effort to obtain scrubbing acid temperatures of 14–15° C. In this manner, it is possible to conduct the cooling of the scrubbing acid with the waste gas without the benefit of auxiliary cooling techniques.

BRIEF DESCRIPTION OF THE DRAWING

The attached drawing is a schematic representation of a preferred process of this invention wherein the waste gas, with precooling, directly cools the dilute scrubbing acid.

DETAILED DESCRIPTION OF THE DRAWING

Roasting gas, freed from dust in an electrostatic hot-gas filter, enters a cooling tower 2, at 1, wherein it is sprayed with dilute sulfuric acid, e.g. 2 to 7% by weight of acid. The dilute sulfuric acid draining off from the cooling tower 2 is cooled by water in a heat exchanger 19 and then recycled to the tower. The gas then passes through conduit 3 into a scrubbing tower 4, wherein it is likewise scrubbed with cycled sulfuric acid e.g., 2 to 7% by weight of acid, and cooled to such an extent that the partial pressure of water vapor corresponds to the amount of water required for the acid production. The roasting gas containing, in addition to sulfur dioxide and some water vapor, minor amounts of sulfuric acid mist, then passes through conduit 5 into a two-stage electrostatic mist eliminator 6 wherein the sulfuric acid mists are precipitated. After leaving the filter, the clarified gas flows through conduit 7 to the gas drying tower 8 wherein the gas is contacted with about 95–97% sulfuric acid, and is dried to a content of less than 0.1 g./Nm.³ of water. This resultant gas is conducted, after passing through the two heat exchangers 9 and 10, into the contact reactor 11, wherein about 98.5% of the $SO_2$ is converted in four stages (with intermediate cooling after the second stage) to $SO_3$. A starting gas with about 10 volume percent of $SO_2$ contains, after discharge from the contact reactor, only 0.15 volume percent of $SO_2$. The converted gas is fed, through conduit 12 and heat exchanger 9, as well as conduit 13, to the absorber 14 wherein the $SO_3$ is absorbed from the gas with concentrated sulfuric acid. The waste gas leaves the absorber 14 through conduit 15, at a temperature of 60° C.

According to the present invention, the waste gas is now cooled, in a subsequent heat exchanger 16, to 30° C. by means of air, and is then fed to a cooling tower 18. In the cooling tower 18, the scrubbing acid from cooling tower 4 is recooled by evaporative cooling from 60° C. to about 23° C. and then pumped back to the cooling tower 4. The waste gas, now substantially saturated with water vapor, leaves the cooling tower 18 via conduit 20. This resultant saturated waste gas can be subjected to a water scrubbing step in order to recover minor amounts of $SO_2$ contained therein; and in this connection, the resultant scrubbing water can be employed for diluting the scrubbing acid in the scrubbing towers 2 and 4. In the cooling tower 18 illustrated in the drawing, the scrubbing acid is conducted countercurrently against the waste gas in finely divided form for cooling purposes. Instead of passing the scrubbing acid through nozzles, this acid can also be distributed in a tower filled with a packing, or by any other conventional distribution technique employed in liquid-gas absorption operations.

The process of this invention is especially advantageous in those cases wherein, because of excessive cooling water temperatures in the gas scrubbing stage, too much water vapor is entrained with the gas into the acid production stage.

Whereas the invention is especially useful in countries having a warm moist climate, even where sufficiently cold cooling water is available, the invention affords the advantage that a direct cooling step can be conducted without the danger of large $SO_2$ losses.

If the scrubbing acid to be cooled contains impurities which form incrustations during the evaporative cooling, the fresh water to be added will be introduced immediately prior to cooling, and the quantity of water will be increased, as compared to the operation with indirect cooling, by the amount of the evaporating water. Also when processing gases having a low $SO_2$ content of, for example, 3 volume percent, it is possible, in accordance with the process of this invention, to reduce the water vapor content of the gases leaving the scrubbing stage by cooling to such an extent that a sulfuric acid of a sufficiently high concentration can be manufactured.

Of course, cooling with waste gas can also be conducted subsequent to a precooling step with atmospheric air.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE

A tower having a height of 3 m. and a cross section of 0.2 m.², filled with "Pall" rings (80 x 80 x 8 mm.), was charged with 0.9 m.³/h. of water of 40° C. From the bottom, 648 Nm.³/h. of waste gas from a sulfuric acid contact plant was introduced at a temperature of 60° C. into the tower. The weight ratio of the waste gas to the water to be cooled was 0.93. The water was discharged at 24° C. This temperature was sufficient for cooling a corresponding amount of scrubbing acid from 55° C. to 33° C.

Generally speaking, the weight ratio of waste gas to cooling liquid is about 0.6:1 to 1:1 respectively in order to cool the cooling liquid from temperatures in the range of 55 to 80 down to about 30 to 60° C. The $SO_2$-containing feed gas is generally cooled from about 300 to 500° C. down to about 30 to 40° C., preferably down to 30 to 35° C. by the cooling process.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. In a contact process for the production of sulfuric acid comprising the steps of:
 (a) purifying hot $SO_2$-containing feed gas by scrubbing with dilute sulfuric acid which is cooled and recycled,
 (b) converting the purified $SO_2$-containing gas to an $SO_3$-containing gas in a contact reactor,
 (c) absorbing $SO_3$ from said $SO_3$-containing gas with sulfuric acid in an absorption unit, and
 (d) withdrawing from the absorption unit a dry waste gas having a temperature of about 30–70° C.,
the improvement comprising cooling said dilute sulfuric acid by evaporative cooling of an aqueous liquid selected from the group consisting of water and dilute sulfuric acid, said evaporative cooling comprising passing said dry waste gas in direct contact with said aqueous liquid, the weight ratio of waste gas to aqueous liquid being about 0.6:1 to 1:1, respectively, whereby said aqueous liquid is cooled from 55–80° C. down to 30–60° C.

2. A process according to claim 1, wherein said aqueous liquid is said dilute sulfuric acid which is cooled by direct contact with said waste gas.

3. A process according to claim 1, wherein the dilute sulfuric acid is indirectly cooled by a cooling water cycle and the cooling water is said aqueous liquid to be cooled and which is cooled by direct contact with said waste gas.

4. A process according to claim 1, further comprising cooling said waste gas in indirect heat exchange with air to 25–35° C. prior to employing said waste gas as said cooling medium.

5. A process according to claim 2, further comprising cooling said waste gas in indirect heat exchange with air to 25–35° C. prior to employing said waste gas as said cooling medium, thereby cooling said dilute acid to about 14–15° C.

6. A process according to claim 3, further comprising cooling said waste gas in indirect heat exchange with air to 25–35° C. prior to employing same as said cooling medium.

7. A process as defined by claim 1 wherein said dilute acid has a concentration of about 2–7% by weight of acid.

8. A process as defined by claim 4, said process being conducted without further cooling stages.

9. A process as defined by claim 1 further comprising the step of subjecting resultant water-bearing waste gas to a water scrubbing step to recover $SO_2$ therefrom, and employing resultant $SO_2$-containing water to dilute said scrubbing acid.

10. A process as defined by claim 1, wherein the $SO_2$-containing feed gas is cooled from about 300 to 500° C. down to about 30 to 40° C.

11. A process according to claim 10, wherein said feed gas is cooled down to 30 to 35° C.

References Cited
UNITED STATES PATENTS

| | | | |
|---|---|---|---|
| 1,862,695 | 6/1932 | Merriam | 23—176 |
| 2,415,142 | 2/1947 | McHaffie et al. | 23—167 X |

FOREIGN PATENTS

| | | | |
|---|---|---|---|
| 744,465 | 2/1956 | England | 55—73 |

OSCAR R. VERTIZ, Primary Examiner

C. B. RODMAN, Assistant Examiner

U.S. Cl. X.R.
423—533